(12) United States Patent
Britten et al.

(10) Patent No.: US 11,079,543 B1
(45) Date of Patent: Aug. 3, 2021

(54) ISOTROPIC ETCHBACK METHOD OF LINEWIDTH TAILORING MULTILAYER DIELECTRIC DIFFRACTION GRATINGS FOR IMPROVEMENT OF LASER DAMAGE RESISTANCE AND DIFFRACTION EFFICIENCY

(75) Inventors: Jerald A. Britten, Clayton, CA (US); Cindy C. Larson, Tracy, CA (US); Hoang T. Nguyen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 674 days.

(21) Appl. No.: 13/244,033

(22) Filed: Sep. 23, 2011

Related U.S. Application Data (60) Provisional application No. 61/385,840, filed on Sep. 23, 2010.

(51) Int. Cl.
  *G02B 6/136* (2006.01)
  *B44C 1/22* (2006.01)

(52) U.S. Cl.
  CPC .................. *G02B 6/136* (2013.01)

(58) Field of Classification Search
  None
  See application file for complete search history.

(56) References Cited

U.S. PATENT DOCUMENTS

| | | | | |
|---|---|---|---|---|
| 4,405,405 A * | 9/1983 | Fujii | ............... | G02B 5/1857 156/212 |
| 4,677,336 A * | 6/1987 | Kushida | ............... | H01L 41/081 204/192.18 |
| 7,256,938 B2 | 8/2007 | Barton et al. | | |
| 2003/0201241 A1* | 10/2003 | Harker | ............... | B29C 59/022 216/2 |
| 2004/0013144 A1* | 1/2004 | Kise | ............... | H01S 5/1228 372/45.013 |
| 2006/0127829 A1* | 6/2006 | Deng | ............... | G02B 5/18 431/188 |
| 2006/0274325 A1* | 12/2006 | Hetzler | ............... | G01B 11/2441 356/521 |
| 2009/0246707 A1 | 10/2009 | Li et al. | | |

(Continued)

OTHER PUBLICATIONS

Britten, J.A et al; "Etch-stop characteristics of Sc2O3 and HfO2 films for multilayer dielectric grating applications"; Journal of Vacuum Science & Technology A 14, 2973 (1996); https://doi.org/10.1116/1.580256 Published Online: Jun. 4, 1998.

(Continued)

*Primary Examiner* — Shamim Ahmed
(74) *Attorney, Agent, or Firm* — James S. Tak (57) ABSTRACT

A method of fabricating a multilayer dielectric (MLD) diffraction grating by providing a multilayer stack having a grating layer, and anisotropically etching the grating layer to form grating lines having an initial lineheight, an initial linewidth, and an initial grating duty cycle, that are greater than a target lineheight, a target linewidth, and a target grating duty cycle, respectively. An isotropic wet etch solution is then used to etch back the grating lines to the target lineheight, the target linewidth, and the target grating duty cycle so as to minimize electric field intensities and maximize diffraction efficiency for a given set of MLD illumination conditions.

6 Claims, 8 Drawing Sheets

(56) References Cited

U.S. PATENT DOCUMENTS

2011/0217804 A1* 9/2011 Abele .................. B81B 3/0075
  438/54
2012/0058582 A1* 3/2012 Tsuji ........................ H01S 5/12
  438/32

OTHER PUBLICATIONS

Britten, J.A et al; "Low Efficiency Gratings for 3rd Harmonic Diagnostics Applications"; 1st Annual Conference on Solid State Lasers for Application to Inertial Confinement Fusion; Monterey, CA May 3-Jun. 2, 1995.

Britten, J.A et al; " Multiscale, mutifunction, diffractive structures wet etched into fused silica for high-laser damage threshold applications"; Applied Optics, vol. 37, No. 30, Oct. 20, 1998, pp. 7049-7054.

* cited by examiner

ISOTROPIC ETCHBACK METHOD OF LINEWIDTH TAILORING MULTILAYER DIELECTRIC DIFFRACTION GRATINGS FOR IMPROVEMENT OF LASER DAMAGE RESISTANCE AND DIFFRACTION EFFICIENCY

CROSS-REFERENCES TO RELATED APPLICATIONS

This application claims the benefit of U.S. Provisional Application No. 61/385,840, filed Sep. 23, 2010 and incorporated by reference herein.

FEDERALLY SPONSORED RESEARCH OR DEVELOPMENT

The United States Government has rights in this invention pursuant to Contract No.: DE-AC52-07NA27344 between the United States Department of Energy and Lawrence Livermore National Security, LLC for the operation of Lawrence Livermore National Laboratory.

FIELD OF THE INVENTION

The present invention relates to multilayer dielectric (MLD) diffraction gratings and methods of fabrication. More particularly, the invention relates to a method of fabricating MLD diffraction gratings with grating profiles tailored and optimized to minimize electric field intensities and maximize diffraction efficiency for a given set of MLD illumination conditions.

BACKGROUND OF THE INVENTION

The technique of chirped pulsed amplification (CPA) has enabled the generation of Petawatt-class laser systems throughout the world. Existing Petawatt-class lasers today are based on Nd:glass architectures with laser pulses nominally of 500 J energy and pulse duration of 500 fs, and use large meter-scale aperture, gold-overcoated master photoresist gratings to compress the final amplified, temporally-stretched chirped pulse. Due to the damage threshold limitation of gold-overcoated gratings, however, newer High-Energy Petawatt (HEPW) class laser systems having laser pulses of greater than 1000 J energy and pulse durations in the 1-10 picosecond time regime, have used MLD diffraction gratings with their potential for increased energy and power handling capacity. MLD diffraction gratings, such as described in U.S. Pat. No. 5,907,436, were successfully demonstrated at Lawrence Livermore National Laboratory (LLNL) and are considered to be considerably more complex to manufacture compared with gold-overcoated gratings.

Despite the advances enabled by MLD diffraction gratings, MLD diffraction gratings possess unique laser damage characteristics, especially when used for Petawatt-class laser system applications. In particular, the shape details (e.g. dimensions and aspect ratio) of the grating line's and the concentration of absorbing impurities on the surface of the grating structures both have strong effects on laser damage threshold.

Figure 1:
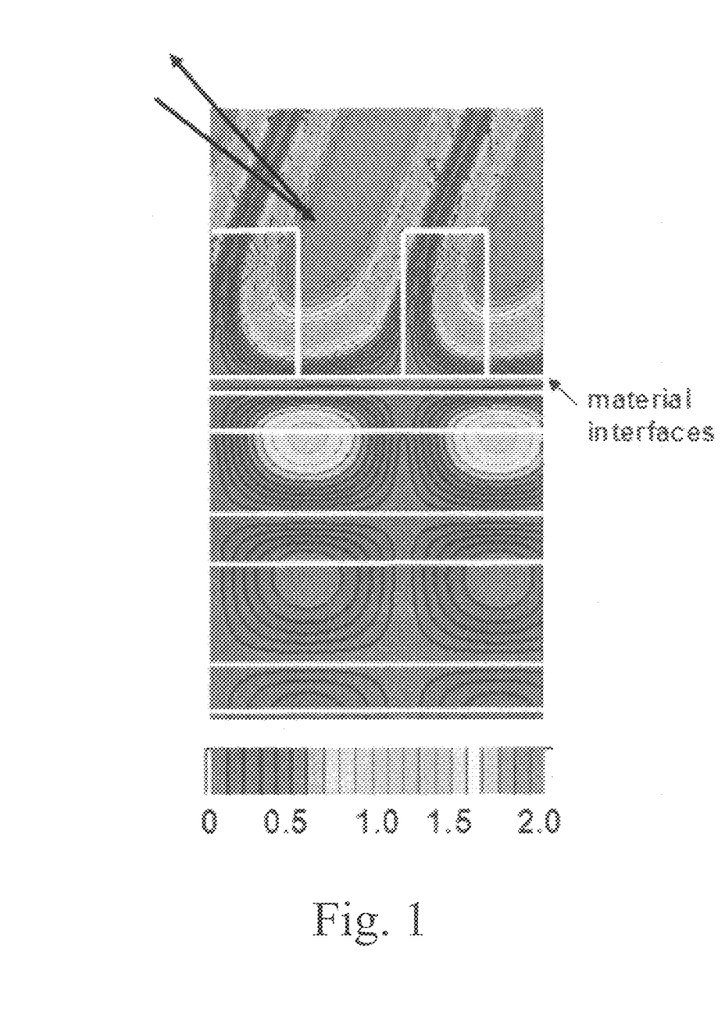
FIG. 1 is a plot diagram modeling electric field distribution in the vicinity of an example diffraction grating with laser radiation incident from the left.
Figure 2:
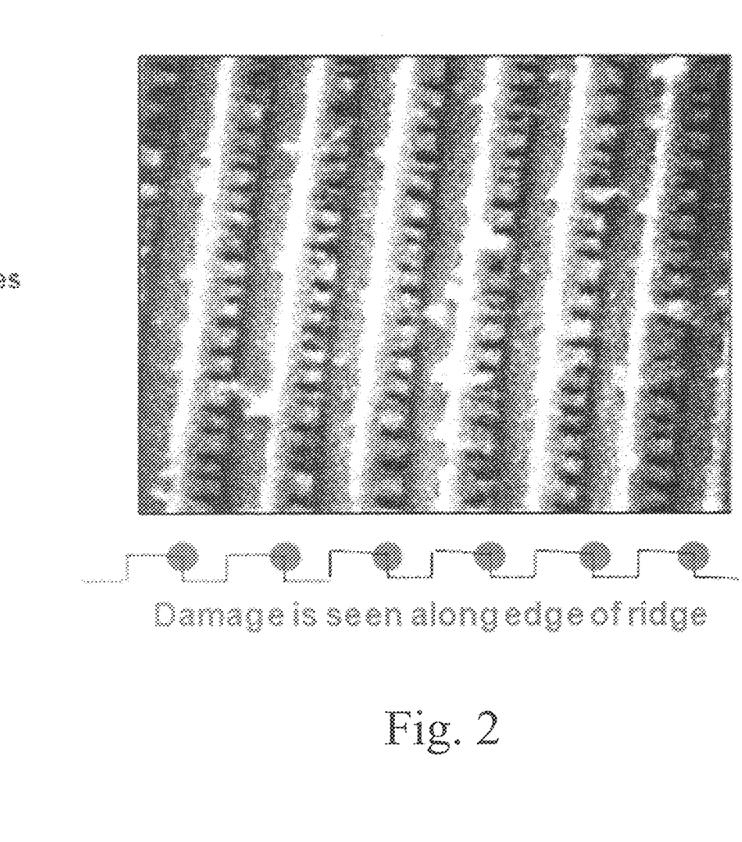
FIG. 2 is a scanning electron micrograph showing damage along the edges of grating ridges.

For instance, it is known that electric field enhancement in the solid material comprising the grating lines varies directly with the linewidth and inversely with the line height for equivalent diffraction efficiency. FIG. 1 shows a plot diagram modeling the electric field distribution in the vicinity of a high diffraction-efficiency MLD grating that is illuminated by a coherent plane wave, shown at reference character 10, and shows periodic maxima set up by interference between the incident and diffracted waves. Material interfaces are shown in white outline at reference character 11. As shown in FIG. 1, the high e-field penetrates into the solid material comprising the grating along the back side of the grating, referenced as the opposite side of the incoming wave 10 from the left. Field enhancements in these 'hot' zones are invariably greater than unity, normalized to the field strength of the incoming wave, and thereby cause grating damage. Field enhancements this large are not typically seen in the solid material of a multilayer high-reflector, for example, so the damage characteristics are expected to be different between MLD mirrors and MLD gratings. FIG. 2 is a scanning electron micrograph showing grating damage localized to the back edges of the grating ridges, corresponding to data published in the article "Ultra-short-Pulse Optical Damage" by Stuart et al (Proc. SPIE, V2714, 616-627 (1995)) on the damage characteristics of MLD.

Therefore, it would be advantageous to provide a method of fabricating MLD diffraction gratings to have tailored grating profiles optimized for minimal electric field intensities and with minimal absorbing impurities on the surface of the grating structures, to increase the laser damage threshold of MLD gratings.

SUMMARY OF THE INVENTION

One aspect of the present invention includes a method of fabricating a multilayer dielectric (MLD) diffraction grating, comprising: providing a multilayer stack having a grating layer; anisotropically etching the grating layer to form grating lines having an initial lineheight, an initial linewidth, and an initial grating duty cycle, that are greater than a target lineheight, a target linewidth, and a target grating duty cycle, respectively; and using an isotropic wet etch solution to etch back the grating lines to the target lineheight, the target linewidth, and the target grating duty cycle.

Another aspect of the present invention includes a method of fabricating a multilayer dielectric (MLD) diffraction grating, comprising: providing a multilayer stack having a grating layer; determining for a predetermined set of grating illumination parameters an optimized grating profile including an optimum lineheight, optimum grating duty cycle, and optimum linewidth, that is optimized for minimal electric field intensities in the grating layer material and maximum diffraction efficiency; anisotropically etching the grating layer to form grating lines having an initial lineheight, initial linewidth, and an initial grating duty cycle, that are greater than the optimum lineheight, optimum grating duty cycle, and optimum linewidth, respectively: and using hydrofluoric (HF) acid solution to isotropically etch back the grating lines to the optimum lineheight, optimum grating duty cycle, and optimum linewidth of the optimized grating profile.

Another aspect of the present invention includes a multilayer dielectric (MLD) diffraction grating comprising: a multilayer stack comprising a plurality of layers including a grating layer with initially anisotropically-etched and subsequently isotropically-wet-etched grating lines having a target lineheight, a target linewidth, and a target grating duty cycle that are less than an initial lineheight, an initial linewidth, and an initial grating duty cycle produced by the initial anisotropic etch.

BRIEF DESCRIPTION OF THE DRAWINGS

The accompanying drawings, which are incorporated into and form a part of the disclosure, are as follows.

DETAILED DESCRIPTION

Generally, the present invention is directed to a method of fabricating MLD diffraction grating which utilizes an isotropic wet-etch solution (e.g. very dilute buffered hydrofluoric (HF) acid solution) to etch grating lines (e.g. high aspect ratio $SiO_2$ grating lines) which were previously anisotropically fabricated into a dielectric grating layer (e.g. a top grating layer or coating). This isotropic wet-etch process functions simultaneously to reduce grating linewidth in a controlled and predictable fashion and remove surface contaminants, thereby improving laser damage thresholds through two pathways. The isotropic etchback process (and in particular the HF etchback process) also enables the ability to easily modify ion-milled profiles to recover or tailor performance of larger-than-optimal linewidths, resulting in a processing tool that can improve yield as well as improve performance.

Figure 14:
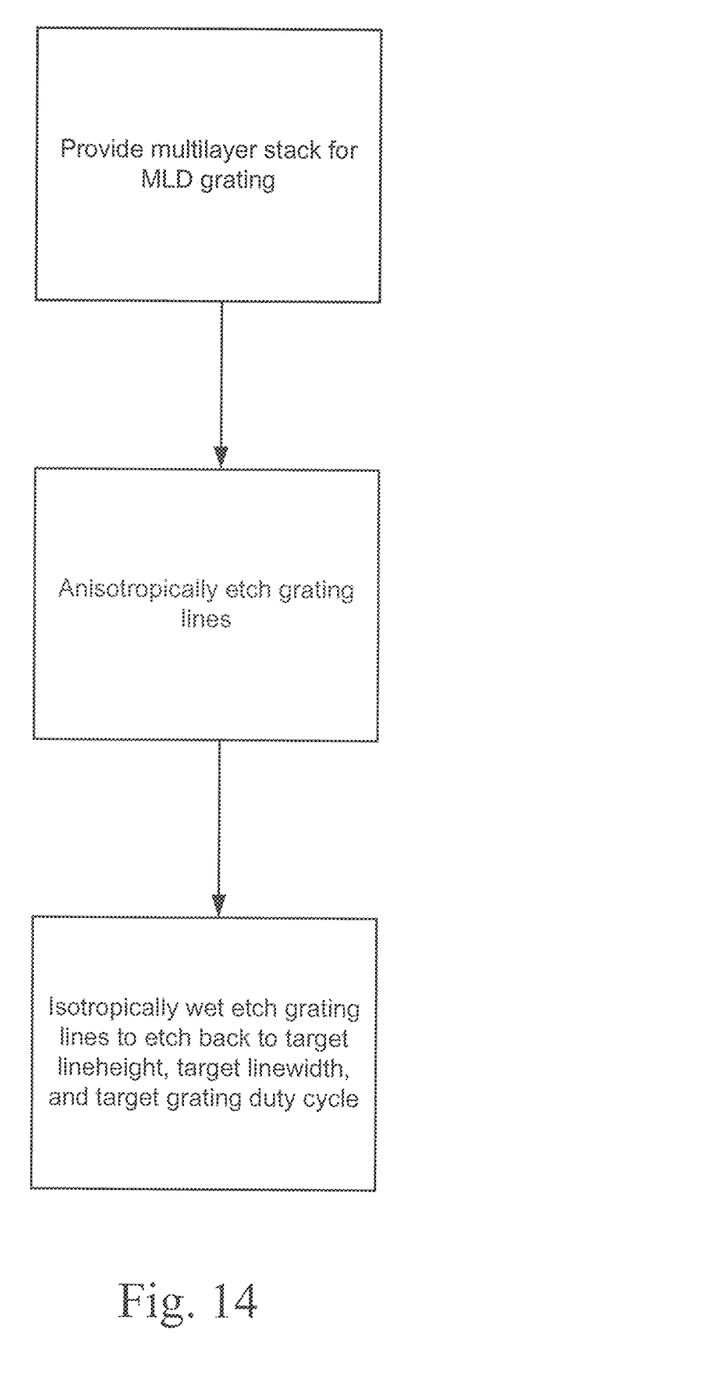
FIG. 14 is a flowchart generally showing an example embodiment of the method of the present invention for fabricating a MLD diffraction grating with improved laser damage resistance and diffraction efficiency.

Turning now to the drawings, FIG. 14 shows a first exemplary embodiment of the method of the present invention for fabricating a multilayer dielectric (MLD) diffraction grating. Generally, the process begins by fabricating or otherwise providing a multilayer stack with high- and low-index layers and having a grating layer (i.e. the layer or layers from which grating lines are formed), indicated at reference character 100. As an example, a single thick $SiO_2$ layer may be used as the grating layer, where $SiO_2$ is chosen for its intrinsic high laser damage threshold. It is notable however that the grating (i.e. grating lines) can be etched into one or several of the deposited dielectric layers. As a further example, the high- and low index layers comprising the multilayer stack may be made of $HfO_2$ and $SiO_2$. This preliminary step may be performed in various ways known in the art, such as for example as described in U.S. Pat. No. 5,907,436 incorporated by reference herein in its entirety. It is notable that at this stage, grating lines are not yet formed on the grating layer.

It is appreciated that various optical designs considerations may be employed for selection and construction of the multilayer stack of the MLD grating. To achieve high diffraction efficiency, however, the optical design of the MLD grating used in the present method may be subject to a number of constraints related to its manufacturability. As an example, a dichroic multilayer coating may be chosen for the MLD diffraction grating that is: (1) highly reflective at the use angle and wavelength, and (2) minimally reflective at the holographic exposure angle and wavelength. This is to minimize standing-wave effects common to pattern generation in photoresist on reflective structures that impact linewidth control. The second criterion in particular places demands on the accuracy of the coating deposition. The design should also be insensitive to coating deposition and grating linewidth variations that can be expected to occur over the meter-size apertures.

In the next step, shown as step 101 in FIG. 14, the grating layer is anisotropically etched to form grating lines having an initial lineheight, initial linewidth, and an initial grating duty cycle. The initial lineheight, initial linewidth, and an initial grating duty cycle are selected to be greater than a target lineheight, a target linewidth, and a target grating duty cycle, respectively. In one example embodiment, the anisotropically etching step may be performed by ion milling (e.g. reactive ion-beam etching) using a holographically-generated vertical-sidewall photoresist mask. This anisotropic etching process produces nearly vertical-sidewall gratings with the linewidth nominally fixed by the mask linewidth.

And in step 102 in FIG. 14, an isotropic wet etch solution is used to etch back the grating lines to the target lineheight, the target linewidth, and the target grating duty cycle. This step, in one example, utilizes a very dilute buffered hydrofluoric (HF) acid solution to wet-etch the previously anisotropically etched grating profiles. It is notable that solubility rates of SiO2 in buffered HF solution are highly dependent on the type of $SiO_2$ being dissolved. This is largely a function of the porosity of the solid. Porous electron-beam deposited $Si_{O2}$ dissolves much more quickly than bulk fused silica or ion-beam sputtered $Si_{O2}$ films. In practice, the concentration of HF in solution may be adjusted according to the nature of the $Si_{O2}$ film being etched, to provide processing time that is reasonably fast yet controllable. Processing times of 1-3 minutes per part are typical. This can be achieved, for example, by commercially available 50:1 BOE solutions (~1% HF, ~40% ammonium fluoride) for gratings etched into bulk fused silica. The 50:1 BOE can be diluted with de-ionized water up to a factor of 20 (i.e. ~0.05% HF, ~2% ammonium fluoride) to treat grating structures patterned in porous electron-beam deposited $Si_{O2}$ layers. Unbuffered HF solutions can also be used. It is appreciated that these are only example concentrations, and should be treated as guidelines only.

Figure 4:
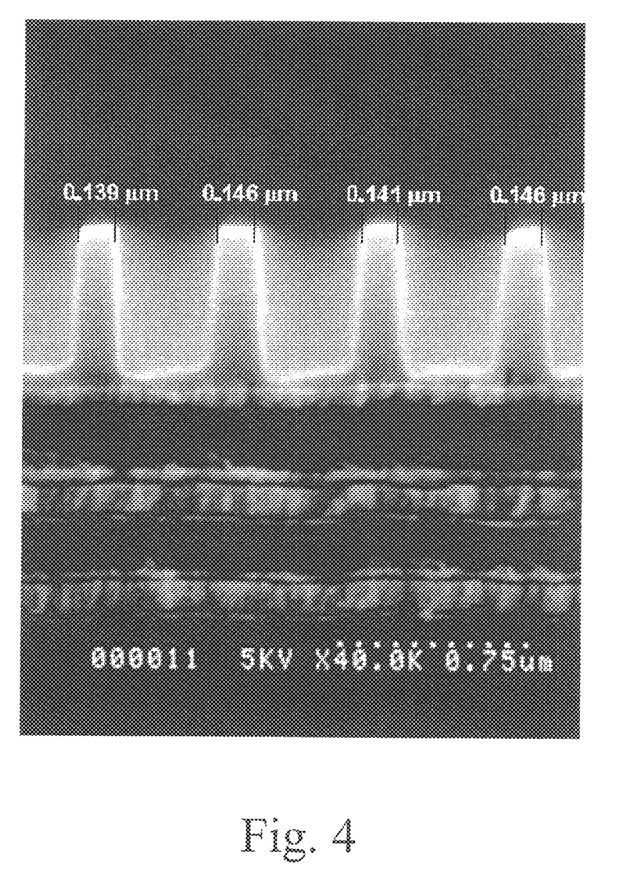
FIG. 4 shows a SEM micrograph of grating profiles after ion-beam etching and cleaning.
Figure 5:
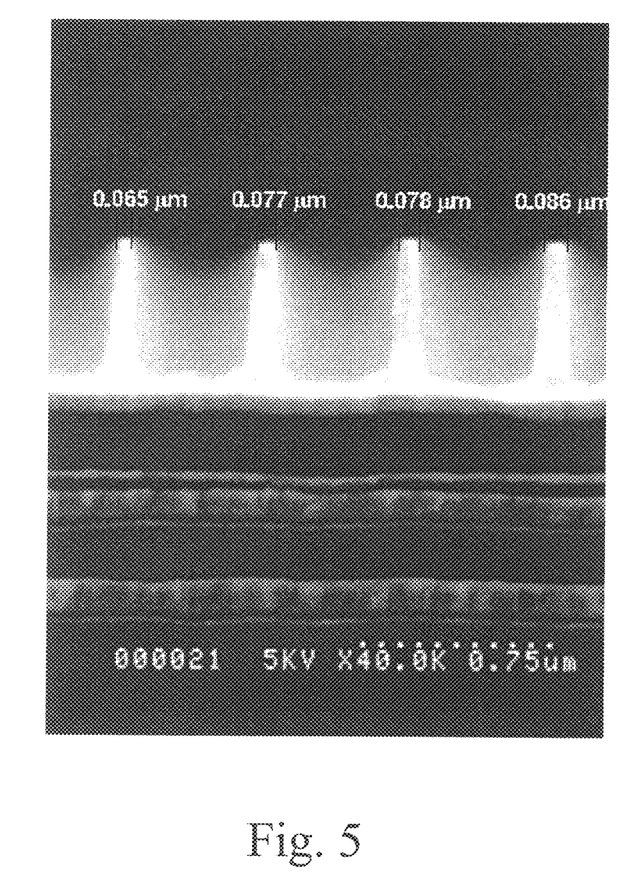
FIG. 5 shows a SEM micrograph of grating profiles after subsequent HF etchback for 6 minutes.

The isotropic etching step acts simultaneously to reduce grating linewidth in a controlled and predictable fashion and remove surface contaminants, thereby improving laser damage thresholds through two pathways. It is appreciated that wet-etching is an isotropic removal process wherein the surface recedes at a constant rate everywhere along the surface normal. For wet-etching of grating lines, this results in a profile evolution that affects the linewidth more strongly than the depth. Line profiles eventually evolve into cusplike shapes with sharp tips. For wet-etching of high aspect-ratio submicron grating lines, precise control is required since very small removal totals have very large effects on duty cycle. Also of significance is that etch rates of deposited $SiO_2$ layers can be very much larger than for bulk fused silica due to the small residual porosity of these layers. FIGS. 4 and 5 shows SEM micrographs comparisons of grating profiles after standard processing and of grating profiles after subsequent HF etchback for 6 minutes.

Figure 6:
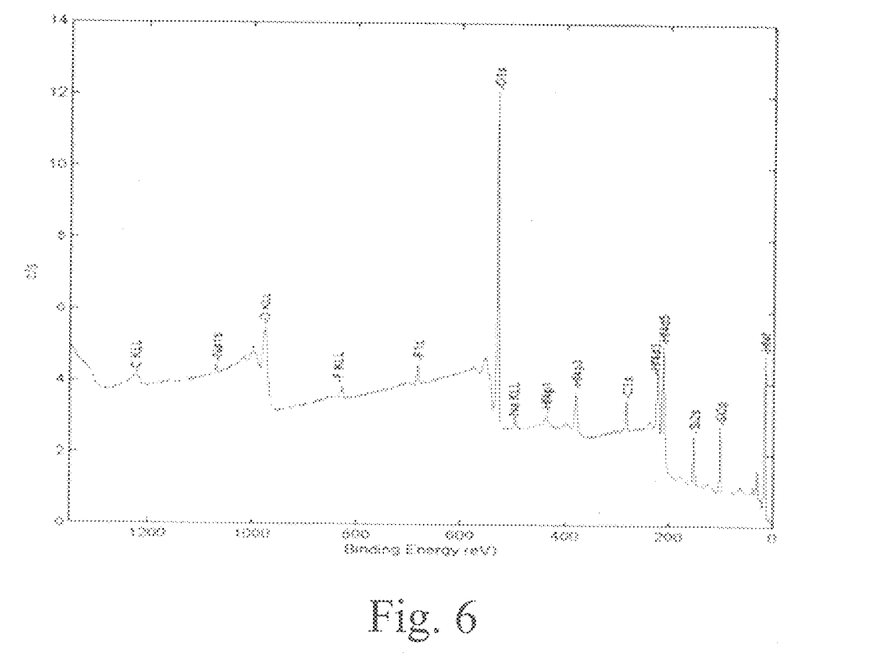
FIG. 6 shows a graph of XPS surface analysis of MLD witness grating L09-153F after standard cleaning following ion beam etching with no $O_2$ (A)
Figure 7:
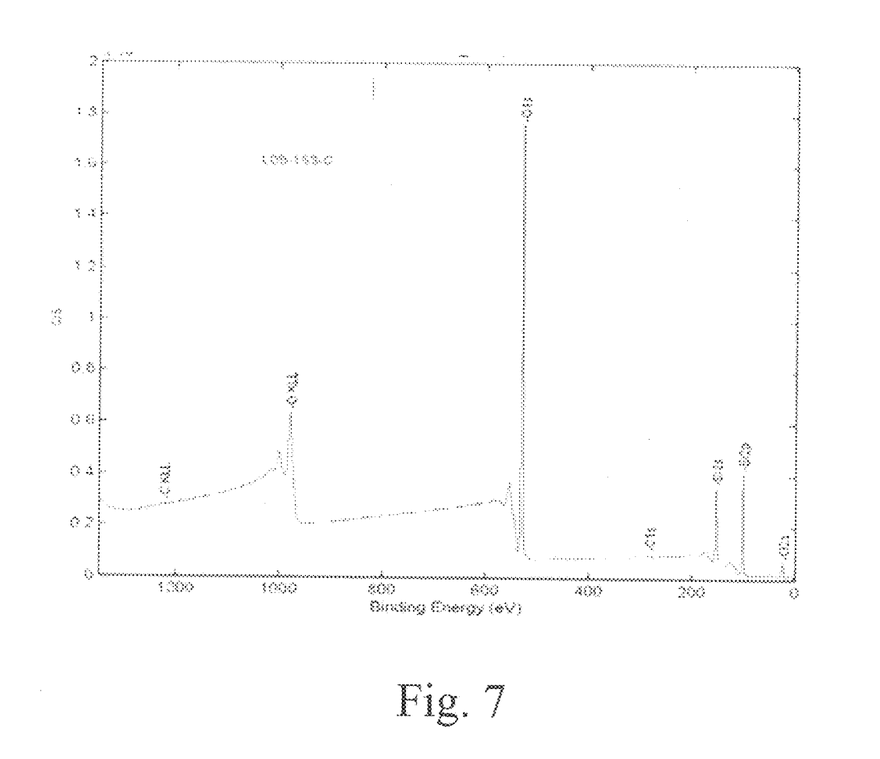
FIG. 7 shows a graph of XPS surface analysis of MLD witness grating L09-153C with same treatment followed by the HF etchback.
Figure 8:
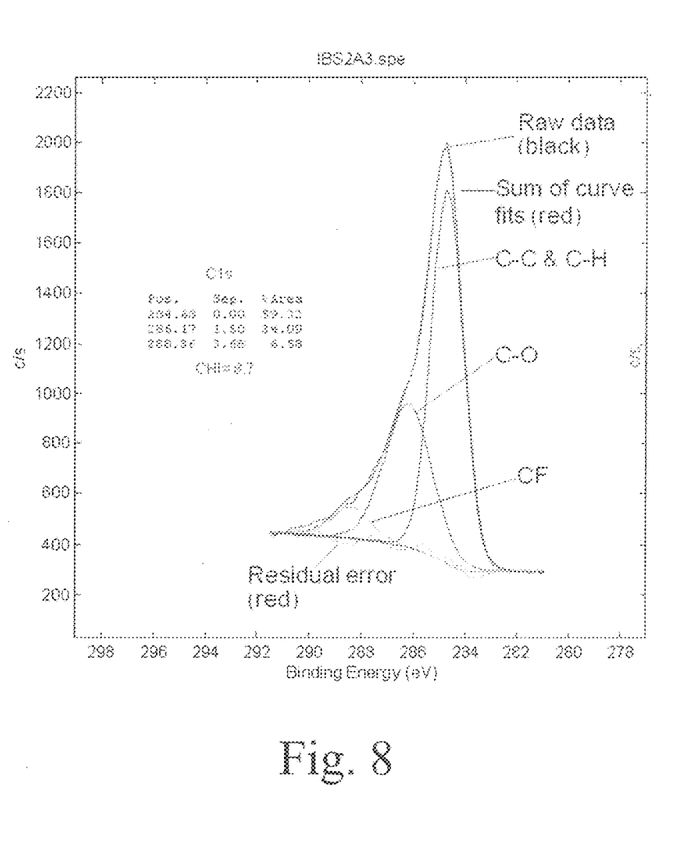
FIG. 8 shows a graph of EXP/EDAX carbon binding energies of ion-milled surface before the cleaning process. CF-bonds are present here.
Figure 9:
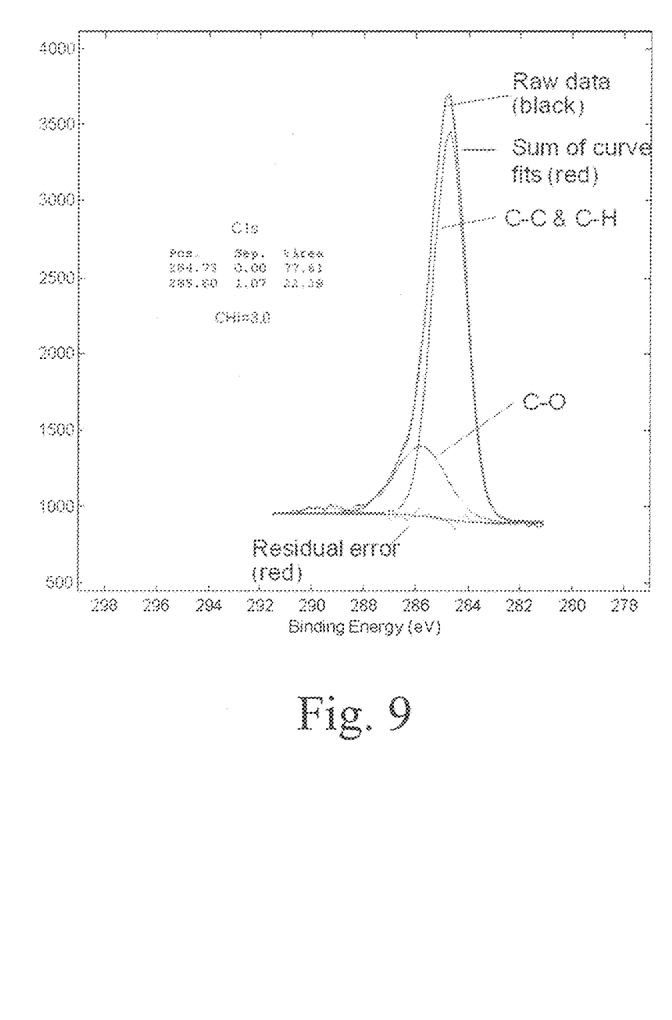
FIG. 9 shows a graph of EXP/EDAX carbon binding energies of ion-milled surface after the cleaning process. CF-bonds are not present here.
Figure 10:
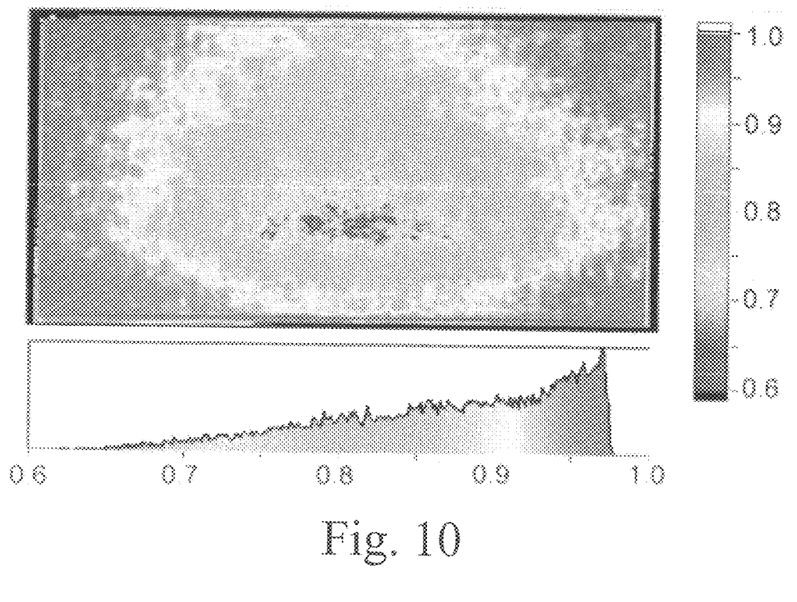
FIG. 10 shows a plot diagram of a diffraction efficiency map of 850×450 mm MLD ARC grating 38035 (1782 l/mm) at 1053 nm, 76.5° before profile etchback with dilute buffered HF solution.
Figure 11:
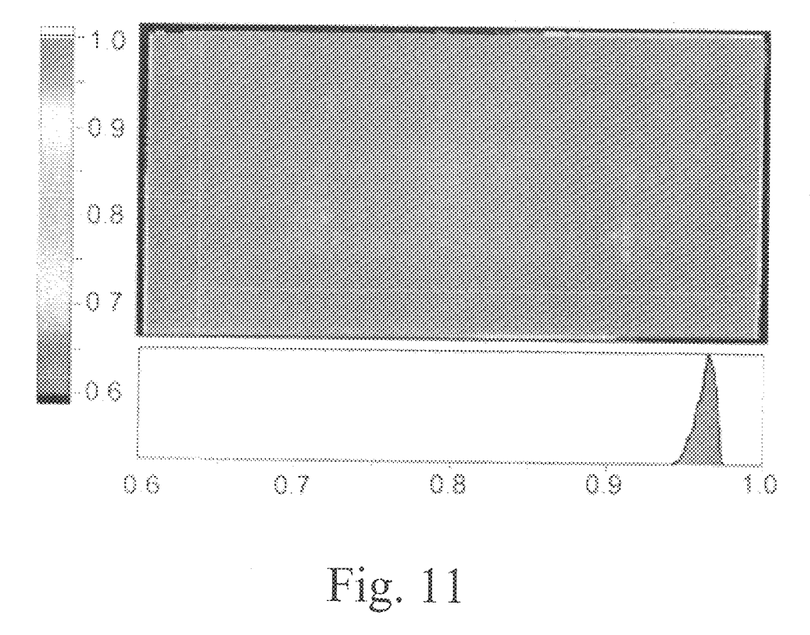
FIG. 11 shows a plot diagram of a diffraction efficiency map of 850×450 mm MLD ARC grating 38035 (1782 l/mm) at 1053 nm, 76.5° after profile etchback with dilute buffered HF solution.
Figure 12:
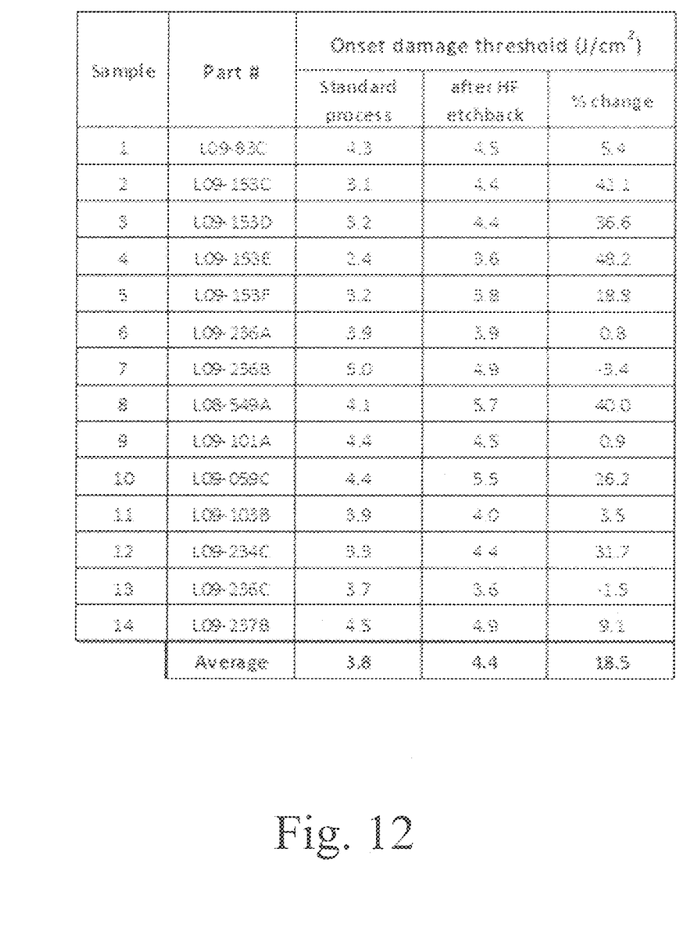
FIG. 12 is a table charting onset of laser damage of 13 MLD witness gratings measured at LLNL (10 ps, 76.5° incidence, 1053 nm, normal incidence fluence), before and after HF etchback process.
Figure 13:
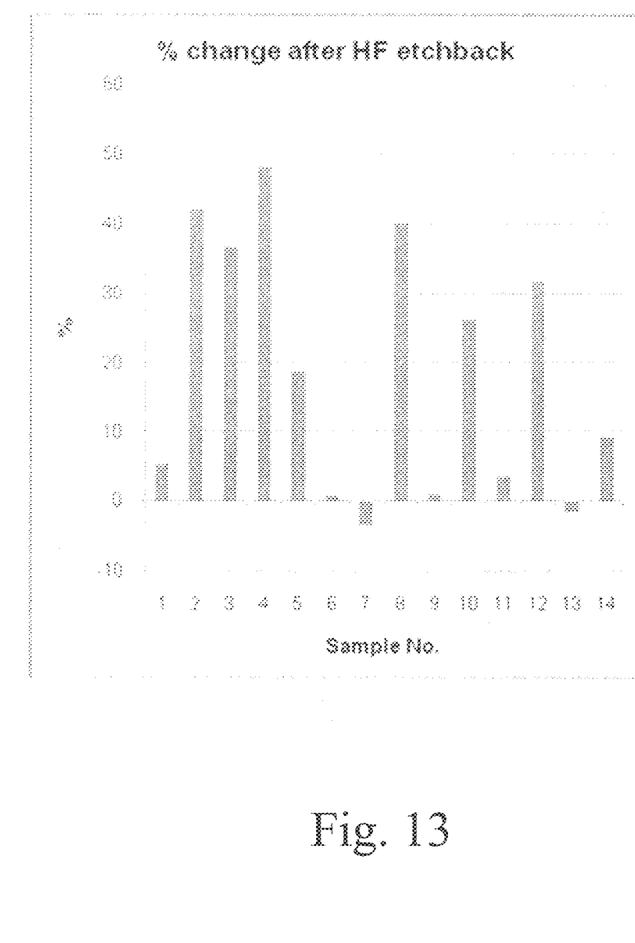
FIG. 13 is a graph corresponding to the table of FIG. 12 showing the percentage change after HF etchback.

Since wet etching removes the entire surface layer, it can be expected that contamination left on the surface by prior processing would be removed as well. FIGS. 6 and 7 show XPS and EXP/EDAX surface analysis data of a witness grating before and after HF etchback treatment. Both FIGS. 6 and 7 show C, O, Si, while FIG. 6 shows signals of F, Na, Hf as well. The data indicate a significant reduction in surface contaminant levels after the etchback treatment. In particular, bond-energy analysis shows the removal of C—F compounds that are a residue from our reactive ion-beam etching process. The isotropic etchback process also allows the ability to easily modify ion-milled profiles to recover or tailor performance if linewidths are larger than optimal, making it a processing tool that can increase yield as well as improve performance. FIG. 6 shows diffraction efficiency comparisons of a 850×450 mm MLD grating after standard processing and after subsequent HF etchback. Of course linewidths less than optimum cannot be improved by this process.

In this manner, the multilayer dielectric (MLD) diffraction grating fabricated according the this method comprises a multilayer stack comprising a plurality of layers including a grating layer with initially anisotropically-etched and subsequently isotropically-wet-etched grating lines having a target lineheight, a target linewidth, and a target grating duty cycle that are less than an initial lineheight, an initial linewidth, and an initial grating duty cycle produced by the initial anisotropic etch.

Figure 3:
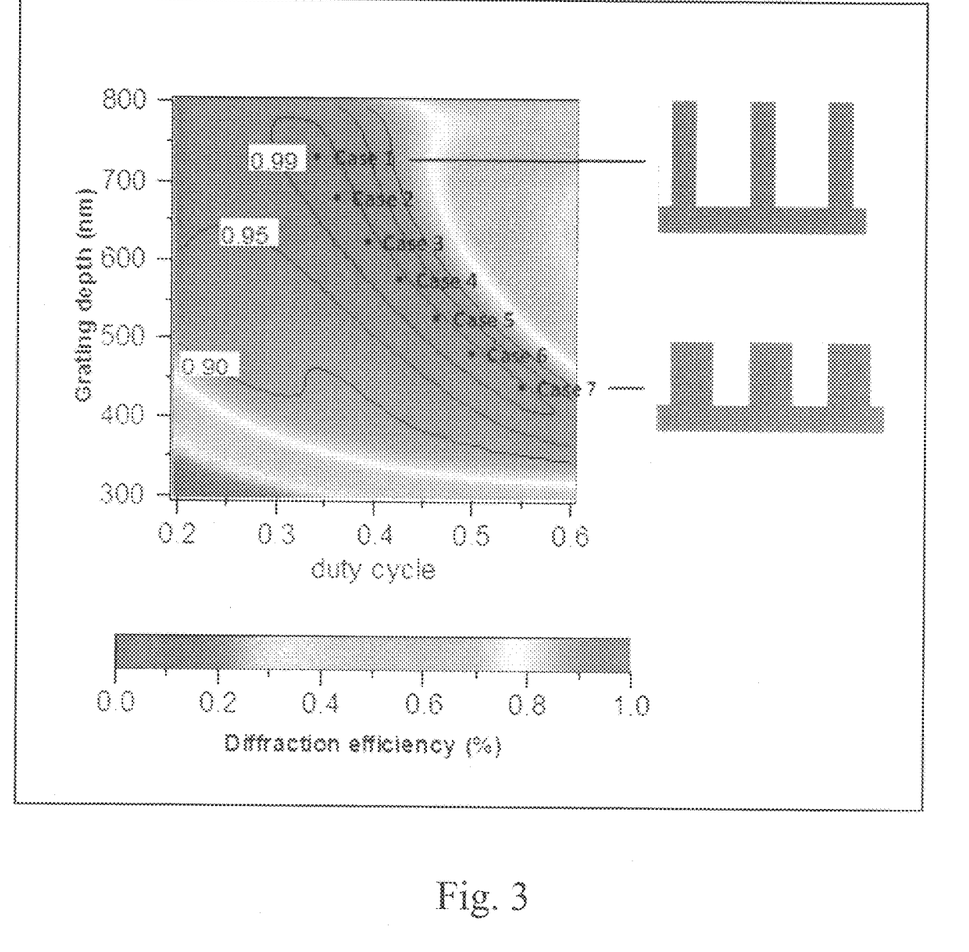
FIG. 3 is a plot diagram of calculated diffraction efficiency as function of grating height and duty cycle for an example 1780 line/mm MLD grating for 1053 nm. TE polarization, 76.5° incidence angle.

In one example embodiment, the grating profiles may be optimized for minimal electric field intensities in the solid grating material, while at the same time maximizing the efficiency. Optimization involves determining, for a predetermined set of grating illumination parameters, an optimized grating profile including an optimum lineheight, optimum grating duty cycle, and optimum linewidth, that is optimized for minimal electric field intensities in the grating layer material and maximum diffraction efficiency. Then the optimum lineheight, optimum grating duty cycle, and optimum linewidth of the optimized grating profile is selected for the target lineheight, target linewidth, and target grating duty cycle, respectively, to which the grating lines are etched back to in the isotropic etch step. For example, FIG. 3 shows a plot of the calculated diffraction efficiency for a given set of MLD illumination conditions (in particular at 1053 nm, 76.5° incidence angle and TE polarization, of a 1780 line/mm ML) grating) as a function of grating height on the vertical axis and grating duty cycle (linewidth/period) on the horizontal axis, for a $HfO_2/SiO_2$ MLD grating with the grating in the top $SiO_2$ layer. From this diagram, the optimum lineheight, optimum grating duty cycle, and optimum linewidth of the optimized grating profile may be selected.

For a given efficiency, maximum electric field in the solid grating material decreases in the direction as the grating height increases and the duty cycle decreases. A surface of high efficiency >99% extends from the lower right to the upper left of this plot, as shown. It is generally true that the electric field strength in the solid material along a line of constant diffraction efficiency decreases as the grating height increases and the duty cycle decreases. Gratings with calculated electric field enhancements of ~1.1 are possible with manufacturable designs having duty cycles of ~25% and height:width aspect ratios of ~5:1. Published data in the article "Effect of Electric Field on Laser Induced Damage Threshold of Multilayer Dielectric Gratings" by Neauport et al. have shown that for fixed incident angle and materials the damage of an MLD grating is directly related to the electric field intensity, which depends on the groove profile as described above.

Fourteen sample gratings were tested at LLNL's small-scale damage test facility before and after HF-etchback treatment. FIG. 7 presents laser damage resistance of several small witness gratings measured at 1053 nm, nominal 10 ps pulse duration, 76.5° incidence angle in air at 10 Hz. Damage thresholds are reported as normal-incidence fluence. Damage was defined as the onset of a visible surface change under brightfield illumination at 10× magnification. An average value for this onset based on 10 sites subjected to a slowly ramped fluence is reported. Seven of the 14 witness showed an increase in damage threshold above 10%, with three improving above 40%. The other half exhibited an insignificant change in performance.

While particular embodiments and parameters have been described and/or illustrated, such are not intended to be limiting. Modifications and changes may become apparent to those skilled in the art, and it is intended that the invention be limited only by the scope of the appended claims.

We claim:

1. A method of fabricating a multilayer dielectric (MLD) diffraction grating, comprising:
   providing a multilayer stack having a grating layer;
   determining a target lineheight, a target linewidth, and a target grating duty cycle of the MLD diffraction grating to be fabricated;
   selecting an initial lineheight, an initial linewidth, and an initial grating duty cycle, that are greater than the target lineheight, the target linewidth, and the target grating duty cycle, respectively;
   anisotropically etching the grating layer to form grating lines having the selected initial lineheight, the initial linewidth, and the initial grating duty cycle; and
   using an isotropic wet etch solution to etch back the grating lines to the target lineheight, the target linewidth, and the target grating duty cycle.

2. The method of claim 1, further comprising:
   determining for a predetermined set of grating illumination parameters an optimized grating profile including an optimum lineheight, optimum grating duty cycle, and optimum linewidth, that is optimized for minimal electric field intensities in the grating layer material and maximum diffraction efficiency; and
   selecting the optimum lineheight, optimum grating duty cycle, and optimum linewidth of the optimized grating profile for the target lineheight, target linewidth, and target grating duty cycle, respectively.

3. The method of claim 1,
   wherein the anisotropically etching step is by ion milling.

4. The method of claim 1,
   wherein the isotropic wet etch solution is a hydrofluoric (HF) acid solution.

5. The method of claim 4,
   wherein the HF acid solution is diluted and buffered.

6. A method of fabricating a multilayer dielectric (MLD) diffraction grating, comprising:
   providing a multilayer stack having a grating layer;
   determining for a predetermined set of grating illumination parameters an optimized grating profile including an optimum lineheight, optimum grating duty cycle, and optimum linewidth, that is optimized for minimal electric field intensities in the grating layer material and maximum diffraction efficiency;
   selecting an initial lineheight, an initial linewidth, and an initial grating duty cycle, that are greater than the optimum lineheight, the optimum linewidth, and the optimum grating duty cycle, respectively;
   anisotropically etching the grating layer to form grating lines having the initial lineheight, the initial linewidth, and the initial grating duty cycle; and
   using hydrofluoric (HF) acid solution to isotropically etch back the grating lines to the optimum lineheight, optimum grating duty cycle, and optimum linewidth of the optimized grating profile.

* * * * *